(12) United States Patent
Wang et al.

(10) Patent No.: US 7,844,447 B2
(45) Date of Patent: Nov. 30, 2010

(54) METHOD AND APPARATUS FOR TRAINING BILINGUAL WORD ALIGNMENT MODEL, METHOD AND APPARATUS FOR BILINGUAL WORD ALIGNMENT

(75) Inventors: Haifeng Wang, Don Cheng District (CN); Zhanyi Liu, Don Cheng District (CN); Hua Wu, Don Cheng District (CN)

(73) Assignee: Kabushiki Kaisha Toshiba, Tokyo (JP)

( * ) Notice: Subject to any disclaimer, the term of this patent is extended or adjusted under 35 U.S.C. 154(b) by 893 days.

(21) Appl. No.: 11/678,378

(22) Filed: Feb. 23, 2007

(65) Prior Publication Data
US 2007/0203690 A1 Aug. 30, 2007

(30) Foreign Application Priority Data
Feb. 28, 2006 (CN) .................. 2006 1 0058067

(51) Int. Cl.
G06F 17/20 (2006.01)
G06F 17/28 (2006.01)
(52) U.S. Cl. .................. 704/8; 704/2; 704/3; 704/10
(58) Field of Classification Search .................. 704/3, 704/8, 10
See application file for complete search history.

(56) References Cited
U.S. PATENT DOCUMENTS

| | | | |
|---|---|---|---|
| 5,477,451 A * | 12/1995 | Brown et al. | 704/9 |
| 5,768,603 A * | 6/1998 | Brown et al. | 704/9 |
| 5,805,832 A * | 9/1998 | Brown et al. | 711/1 |
| 5,893,134 A * | 4/1999 | O'Donoghue et al. | 715/264 |
| 6,349,276 B1 * | 2/2002 | McCarley | 704/8 |
| 7,318,022 B2 * | 1/2008 | Li | 704/10 |
| 2006/0015320 A1 * | 1/2006 | Och | 704/2 |

OTHER PUBLICATIONS

P.F. Brown et al., "The Mathematics of Statistical Machine Translation: Parameter Estimation," Computational Linguistics, 19(2): 263-311.

* cited by examiner

*Primary Examiner*—David R Hudspeth
*Assistant Examiner*—Justin W Rider
(74) *Attorney, Agent, or Firm*—Oblon, Spivak, McClelland, Maier & Neustadt, L.L.P.

(57) ABSTRACT

The present invention provides method and apparatus for bilingual word alignment, method and apparatus for training bilingual word alignment model. The method for training bilingual word alignment model, comprising: training a bilingual word alignment model for a first language and a second language, using a bilingual corpus of the first and second languages; training a bilingual word alignment model for the second language and a third language, using a bilingual corpus of the second and third languages; and estimating a bilingual word alignment model for the first language and the third language, based on said bilingual word alignment model for the first and second languages and said bilingual word alignment model for the second and third languages.

8 Claims, 4 Drawing Sheets

US 7,844,447 B2

METHOD AND APPARATUS FOR TRAINING BILINGUAL WORD ALIGNMENT MODEL, METHOD AND APPARATUS FOR BILINGUAL WORD ALIGNMENT

TECHNICAL FIELD

The present invention relates to information processing technology, specifically to the technology of bilingual word alignment and the technology of statistical machine translation in natural language processing.

TECHNICAL BACKGROUND

Word alignment is widely used in natural language processing. Existing word alignment technology usually uses a statistical word alignment model to align the corresponding words in a bilingual sentence pair. The statistical word alignment model contains statistical information used for determining the corresponding words in a bilingual sentence pair.

In the article by P. F. Brown, S. A. Della Pietra, V. J. Della Pietra and R. Mercer published in 1993, "The Mathematics of Statistical Machine Translation: Parameter Estimation" (Computational Linguistics, 19(2): 263-311), a statistical machine translation model and a statistical word alignment model as well as corresponding parameter estimation method are described.

The statistical word alignment model needs a large enough bilingual corpus to train the parameters. If there is no large enough corpus for training, it is impossible to produce alignment result with high quality by using the obtained parameters. However, for some languages, available bilingual corpus is still less, so the amount of bilingual corpus limits the quality of the statistical word alignment model and becomes an obstacle to the further application of the statistical word alignment model.

SUMMARY OF THE INVENTION

In order to solve above-mentioned problems of the prior technology, the present invention provides a method and apparatus for training a bilingual word alignment model using an intermediate language as well as a method and apparatus for bilingual word alignment.

According to one aspect of the present invention, there is provided a method for training a bilingual word alignment model, comprising: training a bilingual word alignment model for a first language and a second language, using a bilingual corpus of the first and second languages; training a bilingual word alignment model for the second language and a third language, using a bilingual corpus of the second and third languages; and estimating a bilingual word alignment model for the first language and the third language, based on said bilingual word alignment model for the first and second languages and said bilingual word alignment model for the second and third languages.

According to another aspect of the present invention, there is provided a method for bilingual word alignment, comprising: obtaining a bilingual word alignment model for a first language and a third language based on the bilingual corpus of the first and second languages and the bilingual corpus of the second and third languages, by using the above described method for training a bilingual word alignment model; word-aligning a bilingual sentence pair of the first and third languages using said bilingual word alignment model of the first and third languages.

According to another aspect of the present invention, there is provided an apparatus for training a bilingual word alignment model, comprising: a first training unit configured to train a bilingual word alignment model for a first language and a second language, using a bilingual corpus of the first and second languages; a second training unit configured to train a bilingual word alignment model for the second language and a third language, using a bilingual corpus of the second and third languages; and a model estimating unit configured to estimate a bilingual word alignment model for the first language and the third language, based on said bilingual word alignment model for the first and second languages and said bilingual word alignment model for the second and third languages.

According to another aspect of the present invention, there is provided an apparatus for bilingual word alignment comprising: a model obtaining unit configured to obtain a bilingual word alignment model for a first language and a third language based on a the bilingual corpus of the first and second languages and the bilingual corpus of the second and third languages by the above described apparatus for training a bilingual word alignment model; and a word-alignment unit configured to word-align a bilingual sentence pair of the first and third languages using the bilingual word alignment model for the first and third languages.

BRIEF DESCRIPTION OF THE DRAWINGS

It is believed that above-mentioned features, advantages and objectives of the present invention will be better understood through following description of the embodiments of the invention, taken in conjunction with the drawings in which.

DETAILED DESCRIPTION OF THE INVENTION

Next, a detailed description of the preferred embodiments of the present invention will be given in conjunction with the drawings.

Figure 1:
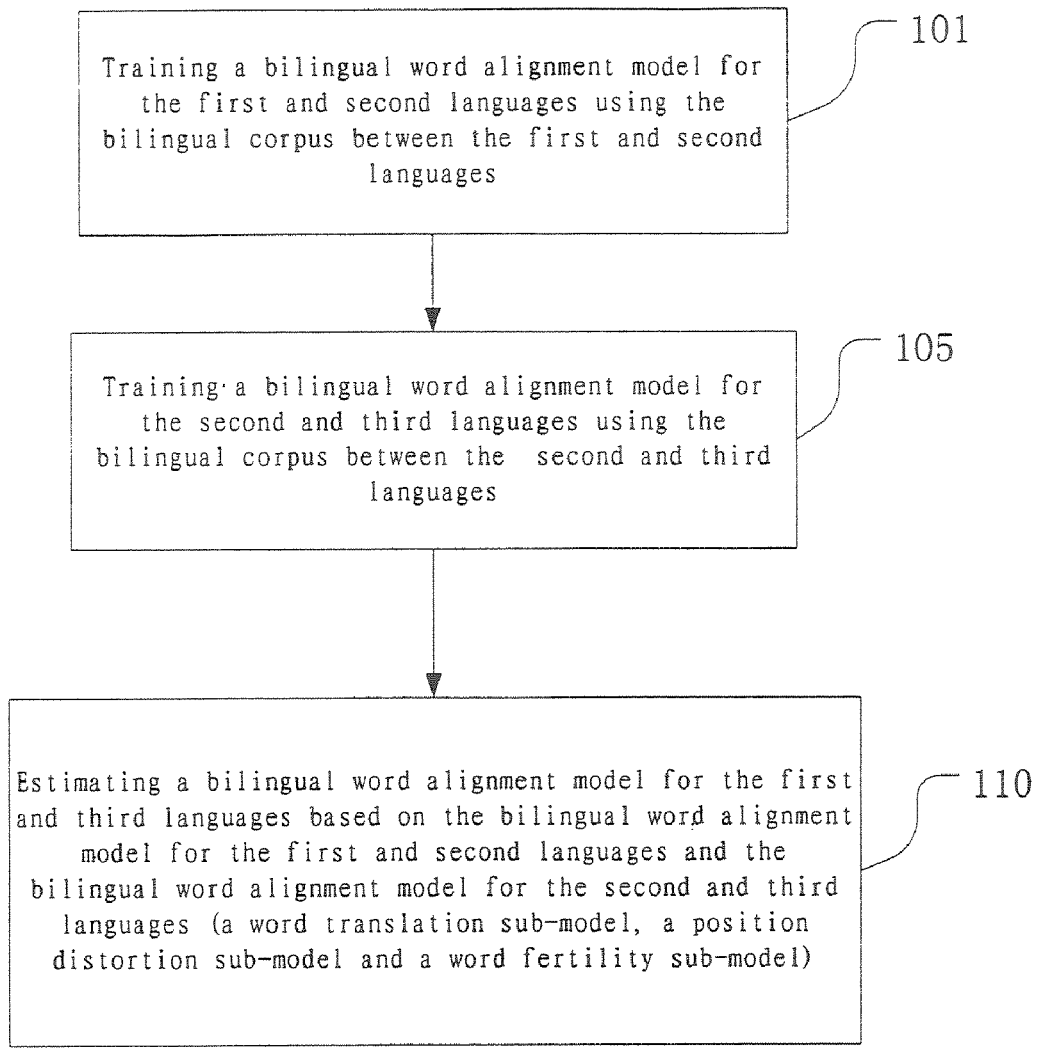
FIG. 1 is a flowchart showing a method for training a bilingual word alignment model according to an embodiment of the present invention.

FIG. 1 is a flowchart showing a method for training a bilingual word alignment model according to an embodiment of the present invention;

As shown in FIG. 1, first in Step 101, the bilingual corpus between the first and second languages is used to train a bilingual word alignment model for the first and second languages. In this embodiment, the bilingual word alignment model includes a word translation sub-model, a position distortion sub-model and a word fertility sub-model.

In these sub-models, the word translation sub-model is a set of word translation probabilities. A word translation probability $p(w_s/w_t)$ is the translation probability from the target word $w_t$ to the source word $w_s$.

The position distortion sub-model is a set of position distortion probabilities. A position distortion probability $p(j/i,l,m)$ is the probability of selecting the $j^{th}$ position in the sentence in source language, given the i$^{th}$ position in the sentence in target language, the length m of the sentence in source language, and the length l of the sentence in target language.

The word fertility sub-model is a set of word fertility probabilities. A word fertility probability $p(\phi_i/w_t)$ is the probability of the target word $w_t$ aligning $\phi_i$ source words.

In this step, using the statistical method, based on the bilingual corpus of the first and second languages, a bilingual word alignment model, i.e., a word translation sub-model, a position distortion sub-model and a word fertility sub-model for the first and second languages is trained.

Next, in Step 105, the bilingual corpus of the second and third languages is used to train a bilingual word alignment model for the second and third languages. Similar to the above Step 101, in this step, using the statistical method, based on the bilingual corpus of the second and third languages, a bilingual word alignment model, i.e., a word translation sub-model, a position distortion sub-model and a word fertility sub-model for the second and third languages is trained.

In this embodiment, it is supposed that a large-scale accurate bilingual corpus between the first and second languages and between the second and third languages is available, but the bilingual corpus between the first and third languages is lack. Thus, through the above Steps 101 and 105, sufficient bilingual corpus between the first and second languages and between the second and third languages may be used to obtain a bilingual word alignment model with good quality for the first and second languages and for the second and third languages.

Next, in Step 110, based on the bilingual word alignment model for the first and second languages and the bilingual word alignment model for the second and third languages, a bilingual word alignment model for the first and third languages is estimated.

In this embodiment, it is needed to estimate a word translation sub-model, a position distortion sub-model and a word fertility sub-model respectively, specifically, including following steps:

estimating a word translation sub-model for the first and third languages, based on the word translation sub-model for the first and second languages and the word translation sub-model for the second and third languages;

estimating a position distortion sub-model for the first and third languages, based on the position distortion sub-model for the first and second languages and the position distortion sub-model for the second and third languages; and estimating a word fertility sub-model for the first and third languages, based on the word fertility sub-model for the first and second languages and/or the word fertility sub-model for the second and third languages, the word translation sub-model for the first and second languages and/or the word translation sub-model for the second and third languages.

Next, a detailed description will be given to the estimation process of the above-mentioned sub-models.

1) First, as to the estimation of a word translation sub-model for the first and third languages Suppose that $p_{CE}(w_c|w_e)$ represents the translation probability from the second language word $w_e$ to the first language word $w_c$, $p_{EJ}(w_e|w_j)$ represents the translation probability from the third language word $w_j$ to the second language word $w_e$, $C(w_j,w_c)$ represents the co-occurrence count of the first language word $w_c$ and the third language word $w_j$, $p(w_c|w_j)$ represents the translation probability from the third language word $w_j$ to the first language word $w_c$, collecting the co-occurrence count of the first language word $w_c$ and the third language word $w_j$, using formula $$C(w_j, w_c) = \sum_{w_e} p_{EJ}(w_e|w_j) * p_{CE}(w_c|w_e);$$

and calculating the translation probability from the third language word $w_j$ to the first language word $w_c$, using formula $$p(w_c|w_j) = \frac{C(w_j, w_c)}{\sum_{w_{c'}} C(w_j, w_{c'})}.$$

2) Next, as to the estimation of a position distortion sub-model for the first and third languages Suppose that $p_{EJ}(k|i,l,m')$ represents the probability that the i$^{th}$ position in the third language sentence having a length of l is corresponding to the k$^{th}$ position in the second language sentence having a length of m', $p_{CE}(j|k,m',m)$ represents the probability that the k$^{th}$ position in the second language sentence having a length of m' is corresponding to the j$^{th}$ position in the first language sentence having a length of m, C(j,i,l,m) and $p_{CJ}(j|i,l,m)$ respectively represent the co-occurrence count and probability that the i$^{th}$ position in the third language sentence having a length of l is corresponding to the j$^{th}$ position in the first language sentence having a length of m, collecting the co-occurrence count that the i$^{th}$ position in the third language sentence having a length of l is corresponding to the j$^{th}$ position in the first language sentence having a length of in, using formula $C(j,i,l,m)=\Sigma_{k,m'}p_{EJ}(k|i,l,m')*p_{CE}(j|k,m',m)$; and calculating the position distortion probability that the i$^{th}$ position in the third language sentence having a length of l is corresponding to the j$^{th}$ position in the first language sentence having a length of m, using formula $$p_{CJ}(j|i, l, m) = \frac{C(j, i, l, m)}{\sum_{j'} C(j', i, l, m)}.$$

3) Finally, as to the estimation of a word fertility sub-model for the first and third languages Suppose that $p_{EJ}(w_e|w_j)$ represents the translation probability form the third language word $w_j$ to the second language word $w_e$, $p_{CE}(\phi_i|w_e)$ represents the probability that the second language word $w_e$ is corresponding to $\phi_i$ words of the first language, $C(\phi_i,w_j)$ and $p(\phi_i|w_j)$ respectively represent the co-occurrence count and probability that the third language word $w_j$ is corresponding to $\phi_i$ words of the first language, collecting the co-occurrence count that the third language word $w_j$ is corresponding to $\phi_i$ words of the first language, using formula $$C(\varphi_i, w_j) = \sum_{w_e} p_{EJ}(w_e|w_j) * p_{CE}(\varphi_i|w_e);$$

and calculating the probability that the third language word $w_j$ is corresponding to $\phi_i$ words of the first language, using formula $$p(\varphi_i | w_j) = \frac{C(\varphi_i, w_j)}{\sum_{\varphi'_i} C(\varphi'_i, w_j)}.$$

From the above description it can be seen that the method for training a bilingual word alignment model of this embodiment may use an intermediate language to solve the problem that there is no way to obtain a word alignment model with high quality due to not sufficient corpus for training. For instance, usually there is not enough bilingual corpus between Chinese and Japanese, which limits the quality of a statistical word alignment model for Chinese and Japanese. By using the method of this embodiment, an intermediate language with a large-scale corpus, such as English, can be used to solve this problem. Because large-scale bilingual corpus between Chinese and English and large-scale corpus between Japanese and English are available, a word alignment model with high quality for Chinese and English and a word alignment model with high quality for Japanese and English can be obtained and a word alignment model for Chinese and Japanese can be further estimated by using the word alignment model for Chinese and English and the word alignment model for Japanese and English.

Of course, the present invention is not limited to the case of Chinese, English and Japanese, and any language may be used as the first, second and third language in the previous embodiments. However, usually those international languages with large-scale corpus should be considered, such as English, French and Spanish.

Figure 2:
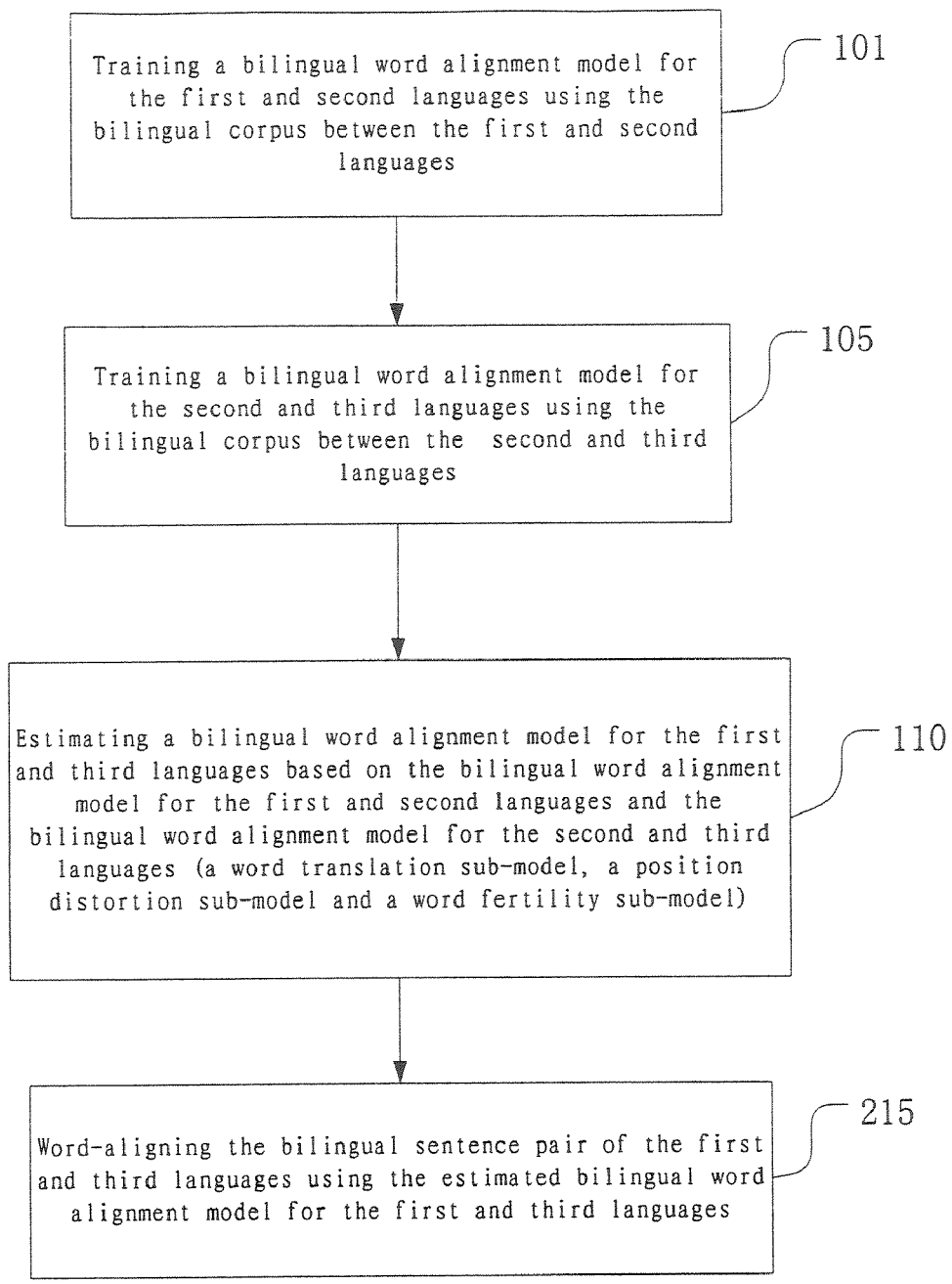
FIG. 2 is a flowchart showing a method for bilingual word alignment according to an embodiment of the present invention.

Under the same inventive concept, FIG. 2 is a flowchart showing a method for bilingual word alignment according to an embodiment of the present invention. Next, in conjunction with the figure, a description will be given to this embodiment. For the parts identical to that in the previous embodiment, explanation will be omitted properly.

As shown in FIG. 2, first in Step 101, a bilingual corpus of a first language and a second language is used to train a bilingual word alignment model for the first and second languages. Then, in Step 105, a bilingual corpus of the second language and a third language is used to train a bilingual word alignment model for the second and third languages. Then, in Step 110, based on said bilingual word alignment model for the first and second languages and said bilingual word alignment model for the second and third languages, a bilingual word alignment model for the first language and the third language is estimated.

Above steps 101, 105 and 110 are basically the same as that in the embodiment shown in FIG. 1 and not repeated here.

Then, in Step 215, the estimated bilingual word alignment model for the first and third languages is used to word-align the bilingual sentences in the first and third languages. Specific alignment manner is:

1. The word translation probability and the position alignment probability are used to find an optimal word alignment for each source language word so as to obtain an alignment series A0.

2. On the basis of the alignment series Ai, the word translation probability, a position distortion model and a word fertility model are used to find a better alignment series Ai+1 through trying exchanging any two alignments or changing an alignment.

3. The process 2 is repeated till no better alignment series is found.

Here, those skilled in the art should understand that any known and future searching algorithms can be used to search an optimal alignment series.

From above description it can be seen that the method for bilingual word alignment of this embodiment may use an intermediate language to solve the problem that there is no way to obtain a word alignment model with high quality due to not sufficient corpus for training. Thus, even for those bilingual languages with less corpus, such as Chinese and English, accurate word alignment can be made.

Figure 3:
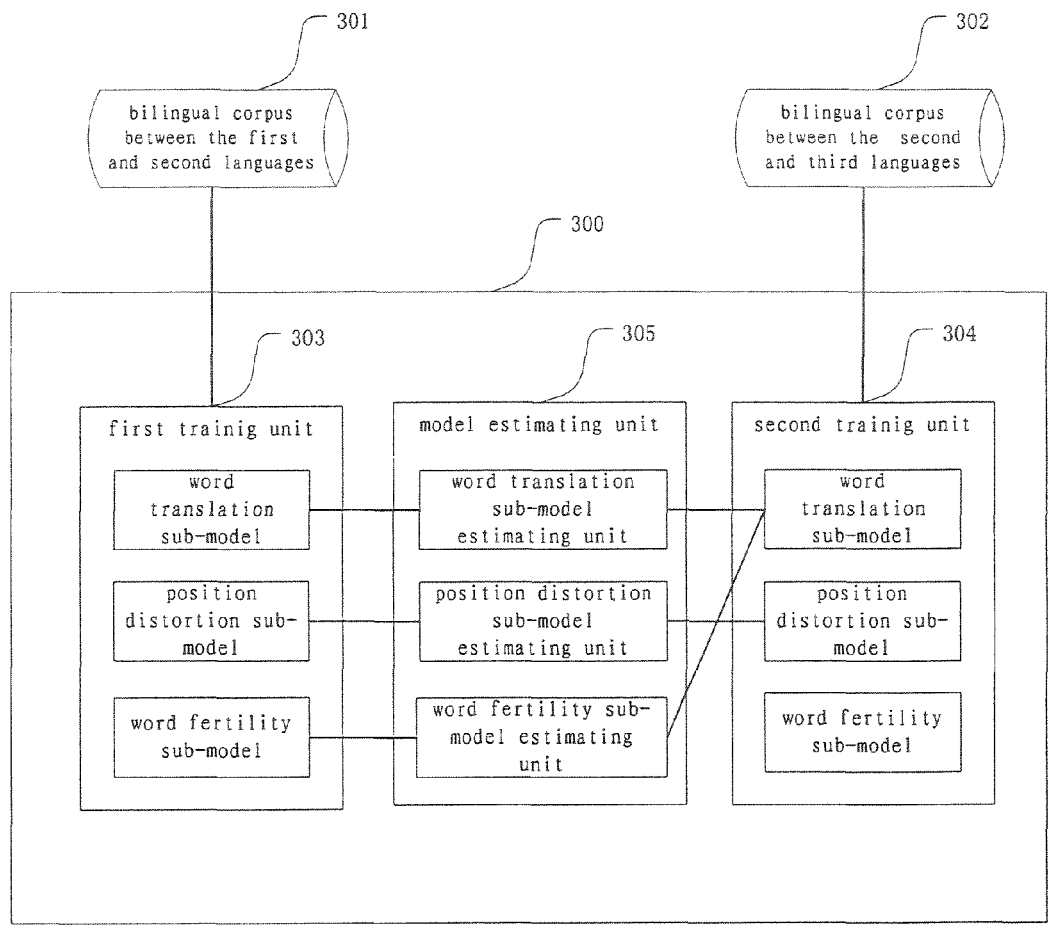
FIG. 3 is a block diagram showing an apparatus for training a bilingual word alignment model according to an embodiment of the present invention.

Under the same inventive concept, FIG. 3 is a block diagram showing an apparatus for training a bilingual word alignment model according to an embodiment of the present invention. Next, in conjunction with the figure, a description will be given to this embodiment. For the parts identical to that in the previous embodiments, explanation will be omitted properly.

As shown in FIG. 3, the apparatus 300 for training a bilingual word alignment model of this embodiment includes: a first training unit 303 configured to train a bilingual word alignment model for a first language and a second language, using a bilingual corpus 301 of the first and second languages; a second training unit 304 configured to train a bilingual word alignment model for the second language and a third language, using a bilingual corpus 302 of the second and third languages; and a model estimating unit 305 configured to estimate a bilingual word alignment model for the first language and the third language, based on said bilingual word alignment model for the first and second languages trained by the first training unit 303 and said bilingual word alignment model for the second and third languages trained by the second training unit 304.

Specifically, said bilingual word alignment model for the first and second languages trained by the first training unit 303 and said bilingual word alignment model for the second and third languages trained by the second training unit 304 respectively comprises: a word translation sub-model, a position distortion sub-model and a word fertility sub-model. Said model estimating unit comprises: a word translation sub-model estimating unit configured to estimate a word translation sub-model for the first and third languages, based on the word translation sub-model for the first and second languages and the word translation sub-model for the second and third languages; a position distortion sub-model estimating unit configured to estimate a position distortion sub-model for the first and third languages, based on the position distortion sub-model for the first and second languages and the position distortion sub-model for the second and third languages; and a word fertility sub-model estimating unit configured to estimate a word fertility sub-model for the first and third languages, based on the word fertility sub-model for the first and second languages and/or the word fertility sub-model for the second and third languages, the word translation sub-model for the first and second languages and/or the word translation sub-model for the second and third languages.

Similar to the previous embodiment, in this embodiment, suppose that $p_{CE}(w_c|w_e)$ represents the translation probability from the second language word $w_e$ to the first language word $w_c$, $p_{EJ}(w_e|w_j)$ represents the translation probability form the third language word $w_j$ to the second language word $w_e$, $C(w_j,w_c)$ represents the co-occurrence count of the first language word $w_c$ and the third language word $w_j$, $p(w_c|w_j)$ represents the translation probability from the third language word $w_j$ to the first language word $w_e$, said word translation sub-model estimating unit collects the co-occurrence count of the first language word $w_c$ and the third language word $w_j$, using formula $$C(w_j, w_c) = \sum_{w_e} p_{EJ}(w_e|w_j) * p_{CE}(w_c|w_e);$$

and calculates the translation probability from the third language word $w_j$ to the first language word $w_c$, using formula $$p(w_c|w_j) = \frac{C(w_j, w_c)}{\sum_{w_{c'}} C(w_j, w_{c'})}.$$

Suppose that $p_{EJ}(k|i,l,m')$ represents the probability that the $i^{th}$ position in the third language sentence having a length of l is corresponding to the $k^{th}$ position in the second language sentence having a length of m', $p_{CE}(j|k,m',m)$ represents the probability that the $k^{th}$ position in the second language sentence having a length of m' is corresponding to the $j^{th}$ position in the first language sentence having a length of m, $C(j,i,l,m)$ and $p_{CJ}(j|i,l,m)$ respectively represent the co-occurrence count and probability that the $i^{th}$ position in the third language sentence having a length of l is corresponding to the $j^{th}$ position in the first language sentence having a length of m, said position distortion sub-model collects the co-occurrence count that the $i^{th}$ position in the third language sentence having a length of l is corresponding to the $j^{th}$ position in the first language sentence having a length of m, using formula $C(j,i,l,m)=\Sigma_{k,m'} p_{EJ}(k|i,l,m')*p_{CE}(j|k,m', m)$;

and calculates the position distortion probability that the $i^{th}$ position in the third language sentence having a length of l is corresponding to the $j^{th}$ position in the first language sentence having a length of m, using formula $$p_{CJ}(j|i, l, m) = \frac{C(j, i, l, m)}{\sum_{j'} C(j', i, l, m)}.$$

Suppose that $p_{EJ}(w_e|w_j)$ represents the translation probability form the third language word $w_j$ to the second language word $w_e$, $\phi_i$, $p_{CE}(\phi_i|w_e)$ represents the probability that the second language word $w_e$ is corresponding to $\phi_i$ words of the first language, $C(\phi_i,w_j)$ and $p(\phi_i|w_j)$ respectively represent the co-occurrence count and probability that the third language word w is corresponding to $\phi_i$ words of the first language, said word fertility sub-model estimating unit collects the co-occurrence count that the third language word $w_j$ is corresponding to $\phi_i$ words of the first language, using formula $$C(\varphi_i, w_j) = \sum_{w_e} p_{EJ}(w_e|w_j) * p_{CE}(\varphi_i|w_e);$$

and calculates the probability that the third language word $w_j$ is corresponding to $\phi_i$ words of the first language, using formula $$p(\varphi_i|w_j) = \frac{C(\varphi_i, w_j)}{\sum_{\varphi_i'} C(\varphi_i', w_j)}.$$

From above description it can be seen that the apparatus for training a bilingual word alignment model of this embodiment can operationally realize the method for training a bilingual word alignment model of the embodiment above described in FIG. 1. By using this embodiment, the problem that there is no way to obtain a word alignment model with high quality due to not sufficient corpus for training can be solved through using an intermediate language.

Here it should be noted that the apparatus 300 for training a bilingual word alignment model of the embodiment and its components can be constructed with dedicated circuits or chips, or can be realized by a computer (processor) through executing corresponding programs.

Figure 4:
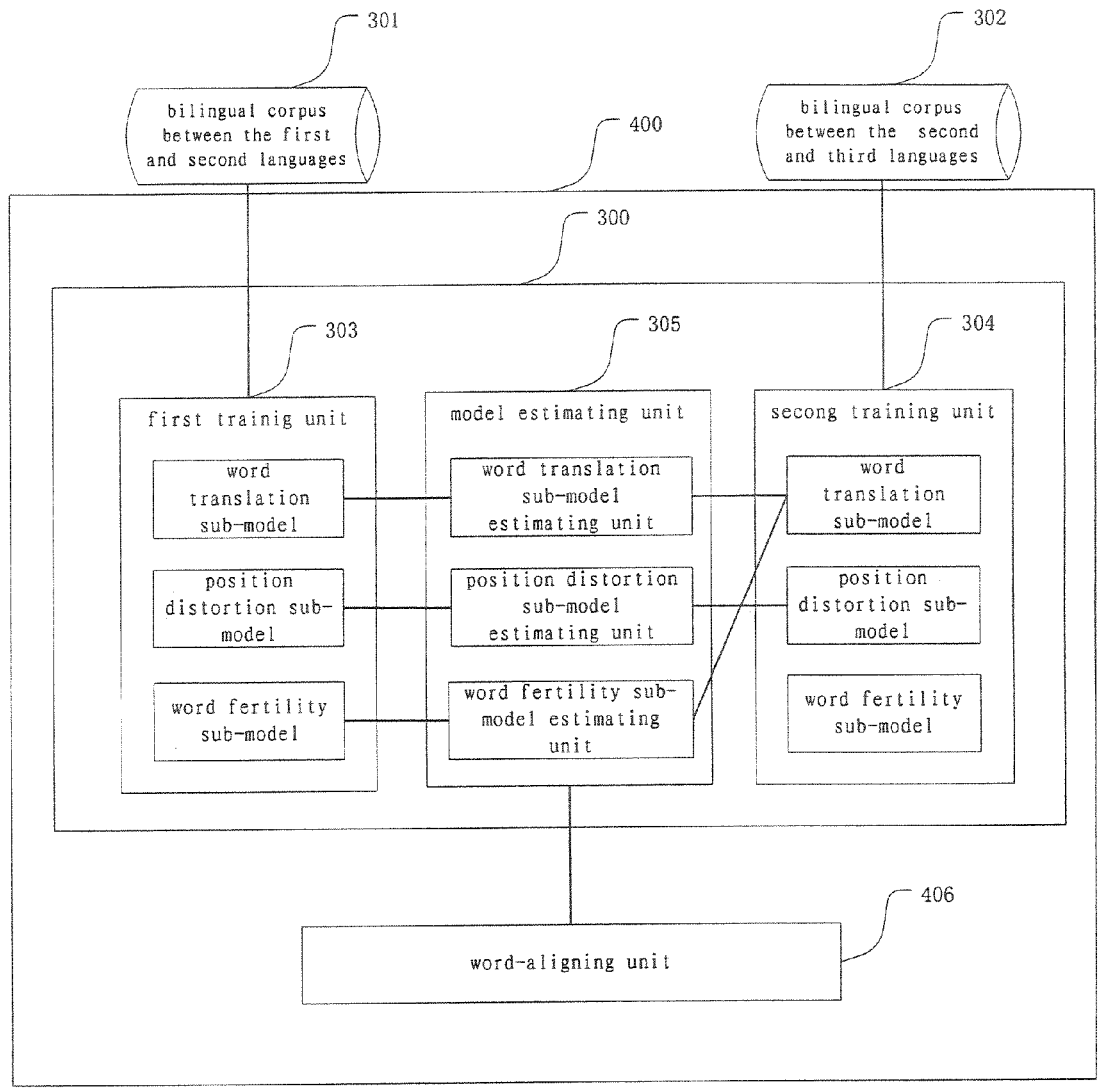
FIG. 4 is a block diagram showing an apparatus for bilingual word alignment according to an embodiment of the present invention.

Under the same inventive concept, FIG. 4 is a block diagram showing an apparatus for bilingual word alignment according to an embodiment of the present invention. Next, in conjunction with the figure, a description will be given to this embodiment. For the parts identical to that in the previous embodiments, explanation will be omitted properly.

As shown in FIG. 4, the apparatus 400 for bilingual word alignment of this embodiment comprises: the apparatus 300 for training a bilingual word alignment model above-described in FIG. 3 and a word alignment unit 406. The word alignment unit 406 word-aligns the bilingual sentence pairs in the first and third languages, using the bilingual word alignment model for the first and third languages obtained by the apparatus 300 for training a bilingual word alignment model. Specific word alignment manner has been described in the previous embodiment and are not repeated here.

From above description it can be seen that the apparatus 400 for bilingual word alignment of this embodiment can operationally realize the method for bilingual word alignment of above described embodiment of the present invention. By using the apparatus for bilingual word alignment of this embodiment, the problem that there is no way to obtain a word alignment model with high quality due to not sufficient corpus for training can be solved through using an intermediate language. Thus, even for those bilingual languages with less corpus, such as Chinese and English, accurate word alignment can be made.

Here it should be noted that the apparatus 400 for bilingual word alignment of the embodiment and its components can be constructed with dedicated circuits or chips, or can be realized by a computer (processor) through executing corresponding programs.

Though a method and apparatus for bilingual word alignment and a method and apparatus for training a bilingual word alignment model of the present invention have been described in details with some exemplary embodiments, these embodiments are not exhaustive. Those skilled in the art may make various variations and modifications within the spirit and scope of the present invention. Therefore, the present invention is not limited to these embodiments, and the scope of the present invention is only defined by the appended claims.

The invention claimed is:

1. A method for training bilingual word alignment model via a programmed computer, comprising:

training a bilingual word alignment model for a first language and a second language, using a bilingual corpus of the first and second languages;

training a bilingual word alignment model for the second language and a third language, using a bilingual corpus of the second and third languages; and estimating a bilingual word alignment model for the first language and the third language, based on said bilingual word alignment model for the first and second languages and said bilingual word alignment model for the second and third languages, wherein said bilingual word alignment model for the first and second languages and said bilingual word alignment model for the second and third languages respectively comprises a word translation sub-model, a position distortion sub-model, and a word fertility sub-model;

said step of estimating a bilingual word alignment model for the first language and the third language comprises:

estimating a word translation sub-model for the first and third languages, based on the word translation sub-model for the first and second languages and the word translation sub-model for the second and third languages;

estimating a position distortion sub-model for the first and third languages, based on the position distortion sub-model for the first and second languages and the position distortion sub-model for the second and third languages; and estimating a word fertility sub-model for the first and third languages, based on the word fertility sub-model for the first and second languages and/or the word fertility sub-model for the second and third languages, the word translation sub-model for the first and second languages and/or the word translation sub-model for the second and third languages, and said step of estimating a word translation sub-model for the first and third languages comprises:

where $p_{CE}(w_c|w_e)$ represents the translation probability from the second language word $w_e$ to the first language word $w_c$, $p_{EJ}(w_e|w_j)$ represents the translation probability from the third language word $w_j$ to the second language word $w_e$, $C(w_j,w_c)$ represents the co-occurrence count of the first language word $w_c$ and the third language word $w_j$, $p(w_c|w_j)$ represents the translation probability from the third language word $w_j$ to the first language word $w_c$, collecting the co-occurrence count of the first language word $w_c$ and the third language word $w_j$, using formula $$C(w_j, w_c) = \sum_{w_e} p_{EJ}(w_e|w_j) * p_{CE}(w_c|w_e);$$

and calculating the translation probability from the third language word $w_j$ to the first language word $w_c$, using formula $$p(w_c|w_j) = \frac{C(w_j, w_c)}{\sum_{w_{c'}} C(w_j, w_{c'})}.$$

2. The method for training bilingual word alignment model according to claim 1, wherein said step of estimating a position distortion sub-model for the first and third languages comprises:

where $p_{EJ}(k|i,l,m')$ represents the probability that the $i^{th}$ position in the third language sentence having a length of l is corresponding to the $k^{th}$ position in the second language sentence having a length of m', $p_{CE}(j|k,m',m)$ represents the probability that the $k^{th}$ position in the second language sentence having a length of m' is corresponding to the $j^{th}$ position in the first language sentence having a length of m, $C(j,i,l,m)$ and $p_{CJ}(j|i,l,m)$ respectively represent the co-occurrence count and probability that the $i^{th}$ position in the third language sentence having a length of l is corresponding to the $j^{th}$ position in the first language sentence having a length of m, collecting the co-occurrence count that the $i^{th}$ position in the third language sentence having a length of l is corresponding to the $j^{th}$ position in the first language sentence having a length of m, using formula $C(j,i,l,m)= \Sigma_{k,m'} p_{EJ}(k|i,l,m') * p_{CE}(j|k,m',m)$; and calculating the position distortion probability that the $i^{th}$ position in the third language sentence having a length of l is corresponding to the $j^{th}$ position in the first language sentence having a length of m, using formula $$p_{CJ}(j|i, l, m) = \frac{C(j, i, l, m)}{\sum_{j'} C(j', i, l, m)}.$$

3. The method for training bilingual word alignment model according to claim 1, wherein said step of estimating a word fertility sub-model for the first and third languages comprises:

where $p_{EJ}(w_e|w_j)$ represents the translation probability from the third language word $w_j$ to the second language word $w_e$, $p_{CE}(\phi_i|w_e)$ represents the probability that the second language word $w_e$ is corresponding to $\phi_i$ words of the first language, $C(\phi_i,w_j)$ and $p(\phi_i|w_j)$ respectively represent the co-occurrence count and probability that the third language word $w_j$ is corresponding to $\phi_i$ words of the first language, collecting the co-occurrence count that the third language word $w_j$ is corresponding to $\phi_i$ words of the first language, using formula $$C(\varphi_i, w_j) = \sum_{w_e} p_{EJ}(w_e|w_j) * p_{CE}(\varphi_i|w_e);$$

and calculating the probability that the third language word $w_j$ is corresponding to $\phi_i$ words of the first language, using formula $$p(\varphi_i|w_j) = \frac{C(\varphi_i, w_j)}{\sum_{\varphi_i'} C(\varphi_i', w_j)}.$$

4. A method for bilingual word alignment via a programmed computer, comprising:

obtaining a bilingual word alignment model for a first language and a third language based on the bilingual corpus of the first and second languages and the bilingual corpus of the second and third languages, by using the method for training bilingual word alignment model according to any one of claim 1, 2, or 3;

word-aligning a bilingual sentence pair of the first and third languages using said bilingual word alignment model of the first and third languages.

5. An apparatus for training bilingual word alignment model, comprising:
- a first training unit configured to train a bilingual word alignment model for a first language and a second language, using a bilingual corpus of the first and second languages;
- a second training unit configured to train a bilingual word alignment model for the second language and a third language, using a bilingual corpus of the second and third languages; and
- a model estimating unit configured to estimate a bilingual word alignment model for the first language and the third language, based on said bilingual word alignment model for the first and second languages and said bilingual word alignment model for the second and third languages, wherein
- said bilingual word alignment model for the first and second languages and said bilingual word alignment model for the second and third languages respectively comprises a word translation sub-model, a position distortion sub-model and a word fertility sub-model;
- said model estimating unit comprises:
  - a word translation sub-model estimating unit configured to estimate a word translation sub-model for the first and third languages, based on the word translation sub-model for the first and second languages and the word translation sub-model for the second and third languages;
  - a position distortion sub-model estimating unit configured to estimate a position distortion sub-model for the first and third languages, based on the position distortion sub-model for the first and second languages and the position distortion sub-model for the second and third languages; and
  - a word fertility sub-model estimating unit configured to estimate a word fertility sub-model for the first and third languages, based on the word fertility sub-model for the first and second languages and/or the word fertility sub-model for the second and third languages, the word translation sub-model for the first and second languages and/or the word translation sub-model for the second and third languages;
- where $p_{CE}(w_c|w_e)$ represents the translation probability from the second language word $w_e$ to the first language word $w_c$, $p_{EJ}(w_e|w_j)$ represents the translation probability form the third language word $w_j$ to the second language word $w_e$, $C(w_j, w_c)$ represents the co-occurrence count of the first language word $w_c$ and the third language word $w_j$, $p(w_c|w_j)$ represents the translation probability from the third language word $w_j$ to the first language word $w_c$,
- said word translation sub-model estimating unit collects the co-occurrence count of the first language word $w_c$ and the third language word $w_j$, using formula $$C(w_j, w_c) = \sum_{w_e} p_{EJ}(w_e|w_j) * p_{CE}(w_c|w_e),$$

and calculates the translation probability from the third language word $w_j$ to the first language word $w_c$, using formula $$p(w_c|w_j) = \frac{C(w_j, w_c)}{\sum_{w_{c'}} C(w_j, w_{c'})}.$$

6. The apparatus for training bilingual word alignment model according to claim 5, wherein
$p_{EJ}(k|i,l,m')$ represents the probability that the $i^{th}$ position in the third language sentence having a length of l is corresponding to the $k^{th}$ position in the second language sentence having a length of m', $p_{CE}(j|k,m',m)$ represents the probability that the $k^{th}$ position in the second language sentence having a length of m' is corresponding to the $j^{th}$ position in the first language sentence having a length of m, $C(j,i,l,m)$ and $p_{CJ}(j|i,l,m)$ respectively represent the co-occurrence count and probability that the $i^{th}$ position in the third language sentence having a length of l is corresponding to the $j^{th}$ position in the first language sentence having a length of m,
said position distortion sub-model estimating unit collects the co-occurrence count that the position in the third language sentence having a length of l is corresponding to the $j^{th}$ position in the first language sentence having a length of m, using formula $C(j,i,l,m)=\Sigma_{k,m'}p_{EJ}(k|i,l,m')*p_{CE}(j|k,m',m)$, and calculates the position distortion probability that the $i^{th}$ position in the third language sentence having a length of l is corresponding to the $j^{th}$ position in the first language sentence having a length of m, using formula $$p_{CJ}(j|i, l, m) = \frac{C(j, i, l, m)}{\sum_{j'} C(j', i, l, m)}.$$

7. The apparatus for training bilingual word alignment model according to claim 5,
wherein $p_{EJ}(w_e|w_j)$ represents the translation probability from the third language word $w_j$ to the second language word $w_e$, $p_{CE}(\phi_i|w_e)$ represents the probability that the second language word $w_e$ is corresponding to $\phi_i$ words of the first language, $C(\phi_i,w_j)$ and $p(\phi_i|w_j)$ respectively represent the co-occurrence count and probability that the third language word $w_j$ is corresponding to $\phi_i$ words of the first language,
said word fertility sub-model estimating unit collects the co-occurrence count that the third language word $w_j$ is corresponding to $\phi_i$ words of the first language, using formula $$C(\varphi_i, w_j) = \sum_{w_e} p_{EJ}(w_e|w_j) * p_{CE}(\varphi_i|w_e),$$

and calculates the probability that the third language word $w_j$ is corresponding to $\phi_i$ words of the first language, using formula $$p(\varphi_i|w_j) = \frac{C(\varphi_i, w_j)}{\sum_{\varphi'_i} C(\varphi'_i, w_j)}.$$

8. An apparatus for bilingual word alignment comprising:
model obtaining unit configured to obtain a bilingual word alignment model for a first language and a third language based on a the bilingual corpus of the first and second languages and the bilingual corpus of the second and third languages by the apparatus for training bilingual word alignment model according to any one of claim 5, 6, or 7 and;

word-alignment unit configured to word-align a bilingual sentence pair of the first and third languages using the bilingual word alignment model for the first and third languages.

* * * * *